United States Patent
Iyer et al.

(10) Patent No.: US 10,282,344 B2
(45) Date of Patent: May 7, 2019

(54) SENSOR BUS INTERFACE FOR ELECTRONIC DEVICES

(71) Applicant: Intel Corporation, Santa Clara, CA (US)

(72) Inventors: Sundar Iyer, Santa Clara, CA (US); Rajasekaran Andiappan, Ekenas (FI); Ajaya V. Durg, Austin, TX (US); Kenneth P. Foust, Beaverton, OR (US); Bruce L. Fleming, Morgan Hill, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/122,575

(22) PCT Filed: Jun. 4, 2015

(86) PCT No.: PCT/US2015/034147
§ 371 (c)(1),
(2) Date: Aug. 30, 2016

(87) PCT Pub. No.: WO2015/199933
PCT Pub. Date: Dec. 30, 2015

(65) Prior Publication Data
US 2017/0103036 A1    Apr. 13, 2017

(30) Foreign Application Priority Data
Jun. 28, 2014 (IN) ............ 3157/CHE/2014

(51) Int. Cl.
*G06F 13/40* (2006.01)
*G06F 13/42* (2006.01)
(Continued)

(52) U.S. Cl.
CPC ........ *G06F 13/4282* (2013.01); *G06F 1/3287* (2013.01); *G06F 13/26* (2013.01);
(Continued)

(58) Field of Classification Search
None
See application file for complete search history.

(56) References Cited

U.S. PATENT DOCUMENTS

| 5,072,365 A | 12/1991 | Burgess et al. |
| 6,297,610 B1 | 10/2001 | Bauer et al. |

(Continued)

FOREIGN PATENT DOCUMENTS

| WO | 95-005627 A1 | 2/1995 |
| WO | 2015199933 A1 | 12/2015 |

OTHER PUBLICATIONS

International Preliminary Report on Patentability received for International Application No. PCT/US2015/034147, dated Jan. 12, 2017, 9 pages.

(Continued)

*Primary Examiner* — Elias Mamo
(74) *Attorney, Agent, or Firm* — Jaffery, Watson, Mendonsa & Hamilton LLP

(57) ABSTRACT

In one example a sensor module comprises at least one sensor and a controller communicatively coupled to the at least one sensor by a communication bus, the controller comprising logic, at least partially including hardware logic, configured to generate a signal to configure the at least one sensor in a notify power state mode and place the signal on a communication bus coupled to the at least one sensor. Other examples may be described.

19 Claims, 8 Drawing Sheets

(51) Int. Cl.
  *G06F 1/3287* (2019.01)
  *G06F 13/26* (2006.01)
  *G06F 13/364* (2006.01)

(52) U.S. Cl.
  CPC .......... *G06F 13/364* (2013.01); *G06F 13/404* (2013.01); *G06F 13/4295* (2013.01); *G06F 2213/0016* (2013.01)

(56) References Cited

U.S. PATENT DOCUMENTS

| | | | |
|---|---|---|---|
| 7,475,158 B2* | 1/2009 | Ferri | H04L 45/02 |
| | | | 455/41.2 |
| 7,945,720 B2 | 5/2011 | Matsunagi et al. | |
| 9,373,245 B2* | 6/2016 | Gerrish | G08B 25/04 |
| 2006/0220834 A1* | 10/2006 | Maeng | G08B 21/24 |
| | | | 340/539.1 |
| 2008/0071328 A1* | 3/2008 | Haubrich | A61B 5/0031 |
| | | | 607/60 |
| 2009/0259758 A1 | 10/2009 | Perry et al. | |
| 2012/0100895 A1* | 4/2012 | Priyantha | H04W 52/0293 |
| | | | 455/574 |
| 2013/0151067 A1* | 6/2013 | Lammers | B60C 23/008 |
| | | | 701/36 |
| 2015/0139051 A1* | 5/2015 | Gonia | H04W 52/0209 |
| | | | 370/311 |

OTHER PUBLICATIONS

International Search Report and Written Opinion received for International Application No. PCT/US2015/034147, dated Sep. 30, 2015, 12 pages.

\* cited by examiner

FIG. 1  Electronic Device 100

SENSOR BUS INTERFACE FOR ELECTRONIC DEVICES

RELATED APPLICATIONS

The present application is a national stage application under 35 U.S.C. § 371 of International Application No. PCT/US2015/034147 filed on Jun. 4, 2015. Said application No. PCT/US2015/034147 claims the benefit of India Application No. 3157/CHE/2014 filed Jun. 28, 2014. Said Application No. PCT/US2015/034147, and said Application No. 3157/CHE/2014 are hereby incorporated herein by reference in their entireties.

BACKGROUND

The subject matter described herein relates generally to the field of electronic devices and more particularly to a sensor bus interface for electronic devices.

Electronic devices such as laptop computers, tablet computing devices, electronic readers, mobile phones, and the like may include location sensors such as global positioning sensors that can determine a location of the electronic device. Further such electronic devices may include sensors, e.g., accelerometers, gyroscopes, etc., for positioning, orientation, motion detection, and the like. The proliferation of sensors in mobile devices has increased the need for the application processor's general purpose input/output (GPIO), resulting in increased cost, board foot print and complexity. Thus, a scalable, cost effective interface between a host and multiple sensors on an electronic device may find utility.

BRIEF DESCRIPTION OF THE DRAWINGS

The detailed description is described with reference to the accompanying figures.

DETAILED DESCRIPTION

Described herein are exemplary systems and methods to implement a sensor bus interface in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic devices with a sensor bus interface which implements techniques to manage communication between sensors and one or more host devices in an electronic device. The subject matter described herein addresses these and other issues by providing a sensor bus interface which may be implemented in logic on one or more controller of the electronic device. In some examples, the sensor bus interface utilizes feedback parameters which are adjusted adaptively in response to inputs from sensors such as an accelerometer sensor, a magnetometer sensor, and a gyroscope sensor. The feedback parameters may be used to adjust sensor characteristics such that the weight of the accelerometer input to the sensor bus interface decreases as the output of the accelerometer increases. Similarly, the weight of the magnetometer input to the sensor bus interface decreases as the output of the magnetometer increases. In some examples the weight of the gyroscope input to the sensor bus interface decreases as the location algorithm implemented by the sensor bus interface converges.

Additional features and operating characteristics of the sensor bus interface and of electronic devices are described below with reference to FIGS. 1-10.

Figure 1:
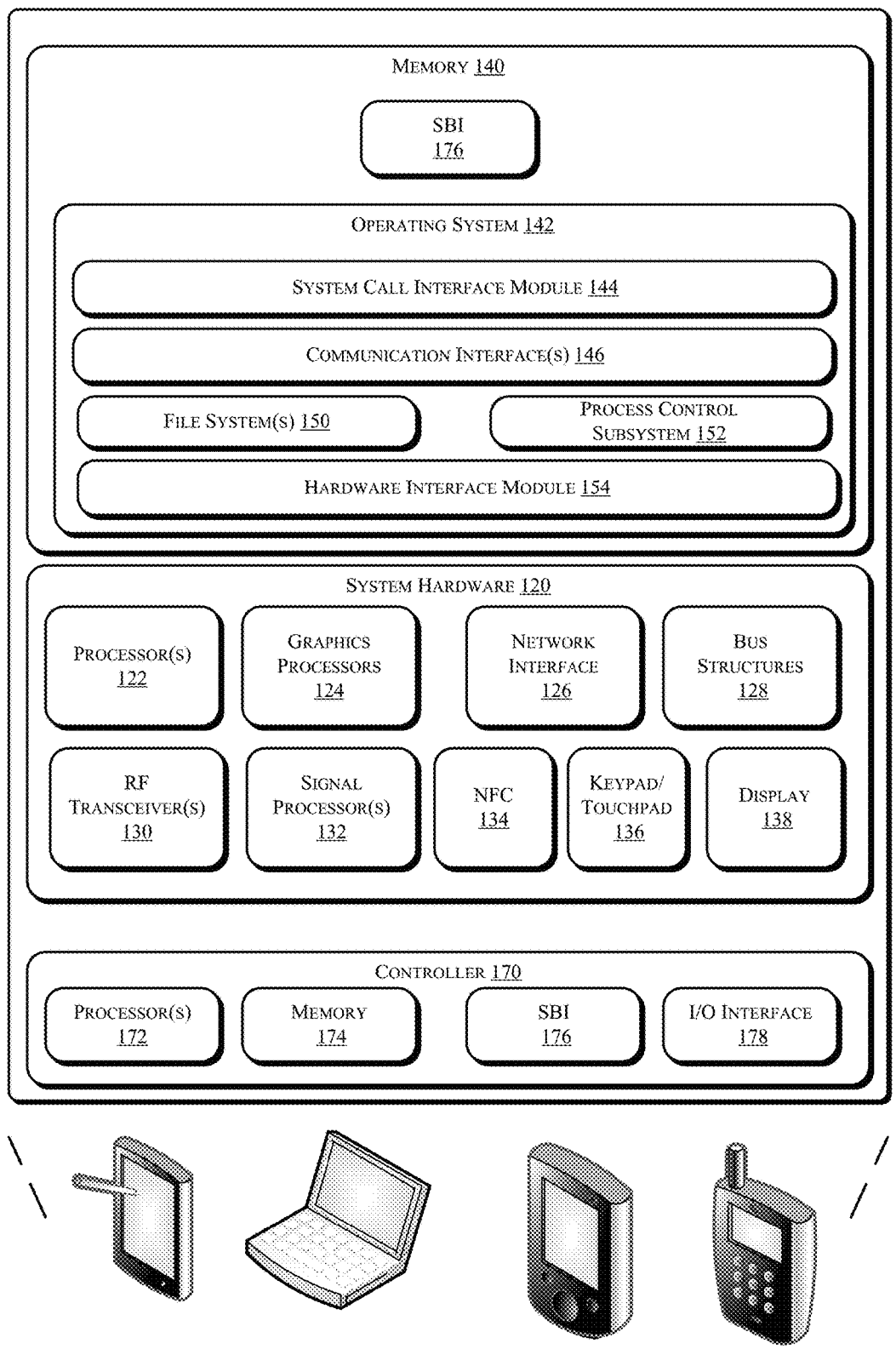
FIG. 1 is a schematic illustration of an electronic device which may be adapted to implement a sensor bus interface in accordance with some examples.

FIG. 1 is a schematic illustration of an electronic device 100 which may be adapted to implement a sensor bus interface in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/ GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the embodiment depicted in FIG. 1 the controller 170 comprises a processor 172, a memory module 174, a sensor bus interface (SBI) 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples the sensor bus interface 176 may reside in the memory 140 of electronic device 100 and may be executable on one or more of the processors 122.

Figure 2:
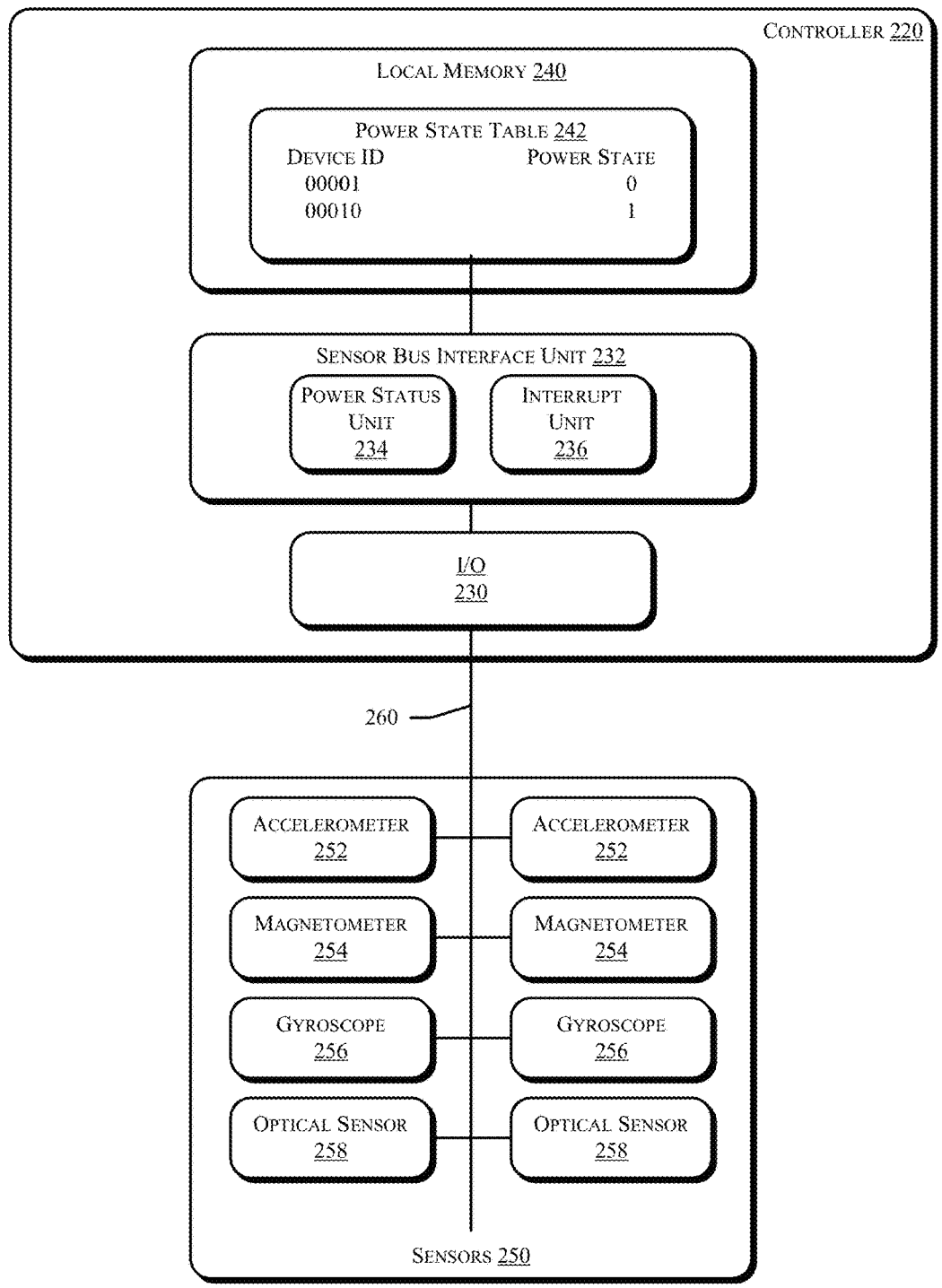
FIG. 2 is a high-level schematic illustration of an exemplary architecture to implement a sensor bus interface in accordance with some examples.

In some examples the a sensor bus interface 176 interacts with one or more other components of the electronic device 100 to manage communication between one or more sensors and a controller on the electronic device. FIG. 2 is a high-level schematic illustration of an exemplary sensor module 200 to implement a sensor bus interface in electronic devices. Referring to FIG. 2, a controller 220 may be embodied as general purpose processor 122 or as a low-power controller such as controllers 170. Controller 220 may comprise an input/output module 230, a sensor bus interface unit 232, and a local memory 240. Sensor bus interface unit 232 comprises a power status unit 234 and an interrupt unit 236. As described above, in some examples the a sensor bus interface 232 may be implemented as logic instructions executable on controller 220, e.g., as software or firmware, or may be reduced to hardwired logic circuits. Local memory 240 may be implemented using volatile and/or non-volatile memory.

Controller 220 may be communicatively coupled to one or more local sensors 250 by a communication bus 260. In some examples the communication bus 260 may be implemented as a inter-integrated circuit (I2C) bus. Sensors 250 provide signals that indicate whether an electronic device is in motion or other environmental conditions. For example, local I/O devices 250 may include accelerometers 252, magnetometers 254, gyroscope sensors 256 and optical sensors 248.

Having described various structures of a system to implement a sensor bus interface in electronic devices, operating aspects of a system will be explained with reference to FIGS. 3-5, which are flowcharts illustrating operations in a method to implement a sensor bus interface in accordance with some examples. The operations depicted in the flowcharts of FIGS. 3-5 may be implemented by the controller 220, alone or in combination with one of the sensors 250 of electronic device 100.

In some examples the controller 220 implements operations to configure at least one of the sensors 250. Referring to FIG. 3, at operation 310 the power status unit 234 of controller 220 generates a signal to configure at least one of the sensors 250 into a notify power state mode. For example, the sensor(s) may be configured to notify the controller 220 of a change in its power status by way of transmitting an interrupt on communication bus 260.

Similarly, at operation 315 the interrupt unit 236 of controller 220 generates a signal to configure at least one of the sensors with an interrupt priority level. The interrupt priority level may be set to an initial value during a configuration process and may be adjusted in response to changing conditions. For example, the interrupt priority of an accelerometer 252 may set to an initial value during the configuration process and increased in response to a determination that the electronic device 100 is in motion. Conversely, the interrupt priority of the accelerometer 252 may decreased in response to a determination that the electronic device 100 is no longer in motion.

At operation 320 the controller 220 places the signals generated in operations 310 and 315 on the communication bus 260. One skilled in the art will recognize that the operations depicted in FIG. 3 may be repeated for multiple sensors 250 during a configuration process, then may be repeated on a periodic basis or in response to changing conditions.

Figure 4:
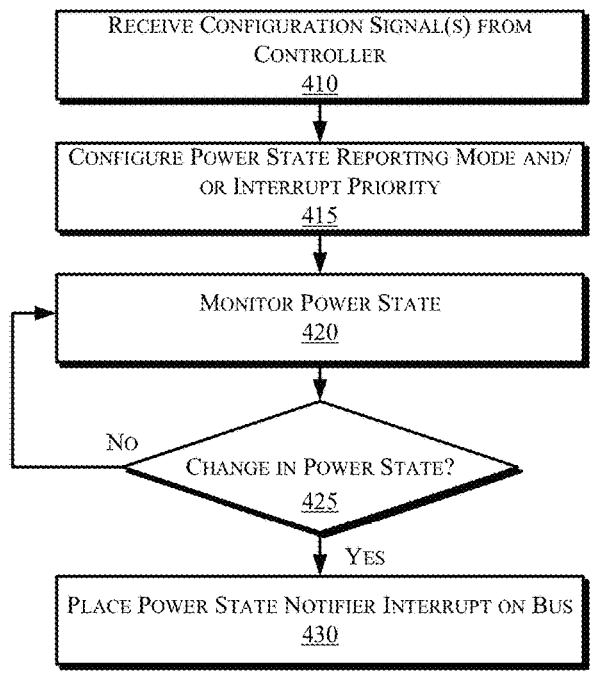

FIG. 4 depicts operations implemented in the respective sensors 250. Referring to FIG. 4, at operation 410 the sensor(s) 250 receive the configuration signal(s) from the controller 220, and at operation 415 the sensor(s) configure their respective power state reporting mode(s) and interrupt priorities in accordance with the signal(s) received from the controller 220.

At operation 420 the respective sensors 250 monitor their respective power states. If, at operation 425, there is no change in a sensor's power state then control passes back to operation 420 and the monitoring process continues. By contrast, if at operation 425 there is a change in the power state then control passes to operation 430 and the sensor places a power state notifier interrupt on the communication bus 260.

Figure 5:
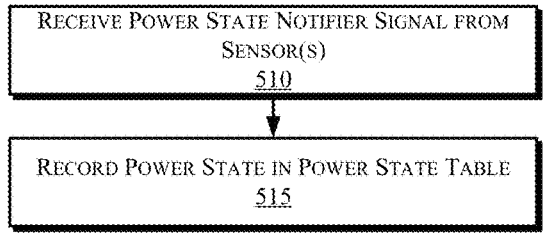

FIG. 5 depicts operations implemented by the controller 220. At operation 510 the controller 220 receives a power state notifier signal from the sensor(s) 250, and at operation 515 the controller records the power state received from the sensor(s). Referring briefly to FIG. 2, in some examples the controller updates an entry in the power state table 242 which resides in local memory 240 with the power state received in the signal.

Figure 3:
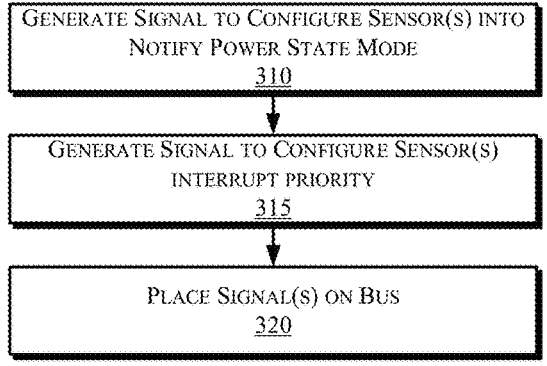
FIGS. 3-5 are flowcharts illustrating operations in a method to implement a sensor bus interface in accordance with some examples.

Thus, the operations depicted in FIGS. 3-5 enable a sensor module 200 in an electronic device 100 to maintain a record of the current power state of the respective sensors 250 in the electronic device 100. Further, the interrupt priority of a sensor 250 may be adjusted dynamically in response to operating conditions of the electronic device.

Figure 6:
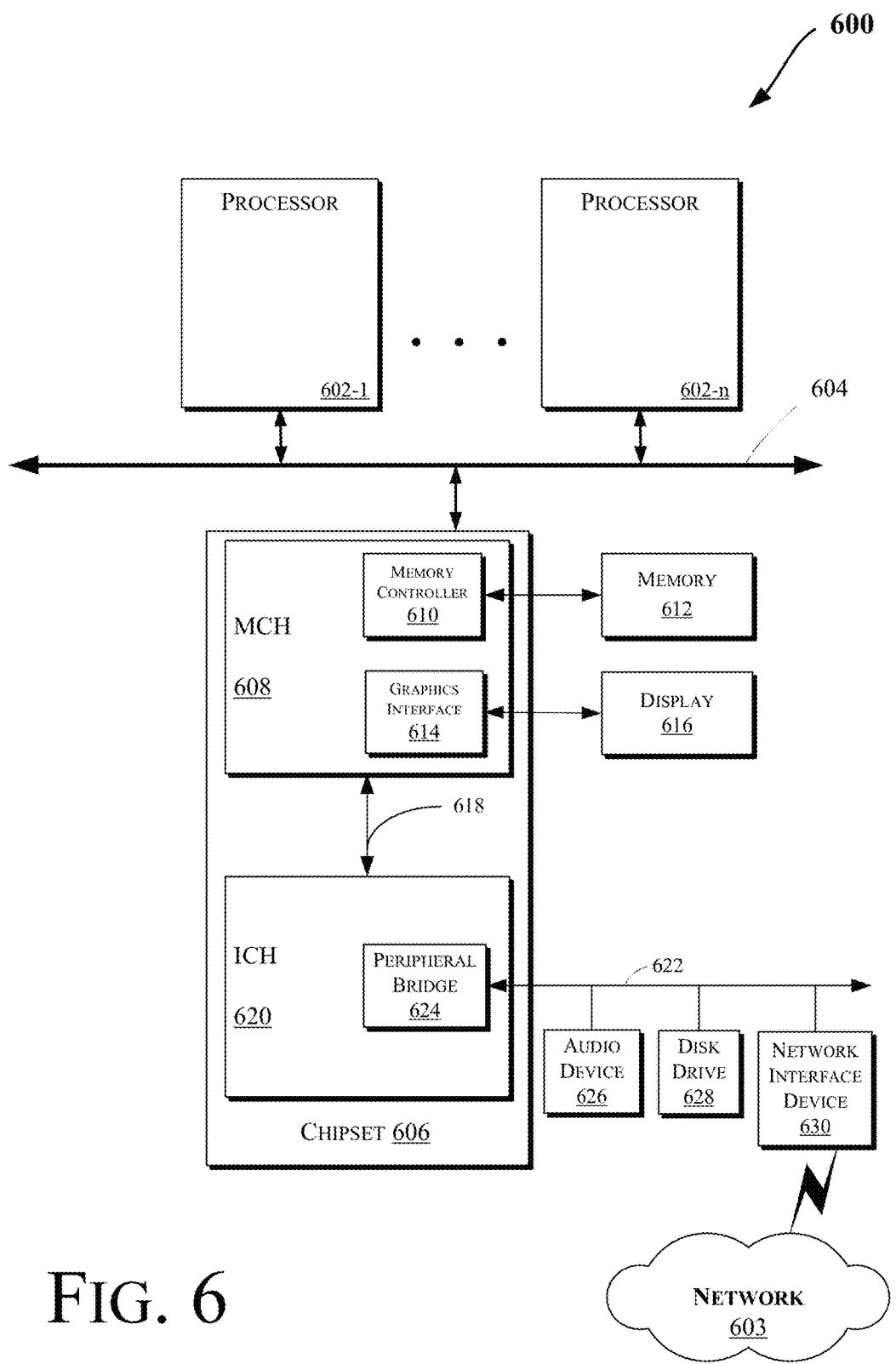
FIGS. 6-10 are schematic illustrations of electronic devices which may be adapted to implement smart frame toggling in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
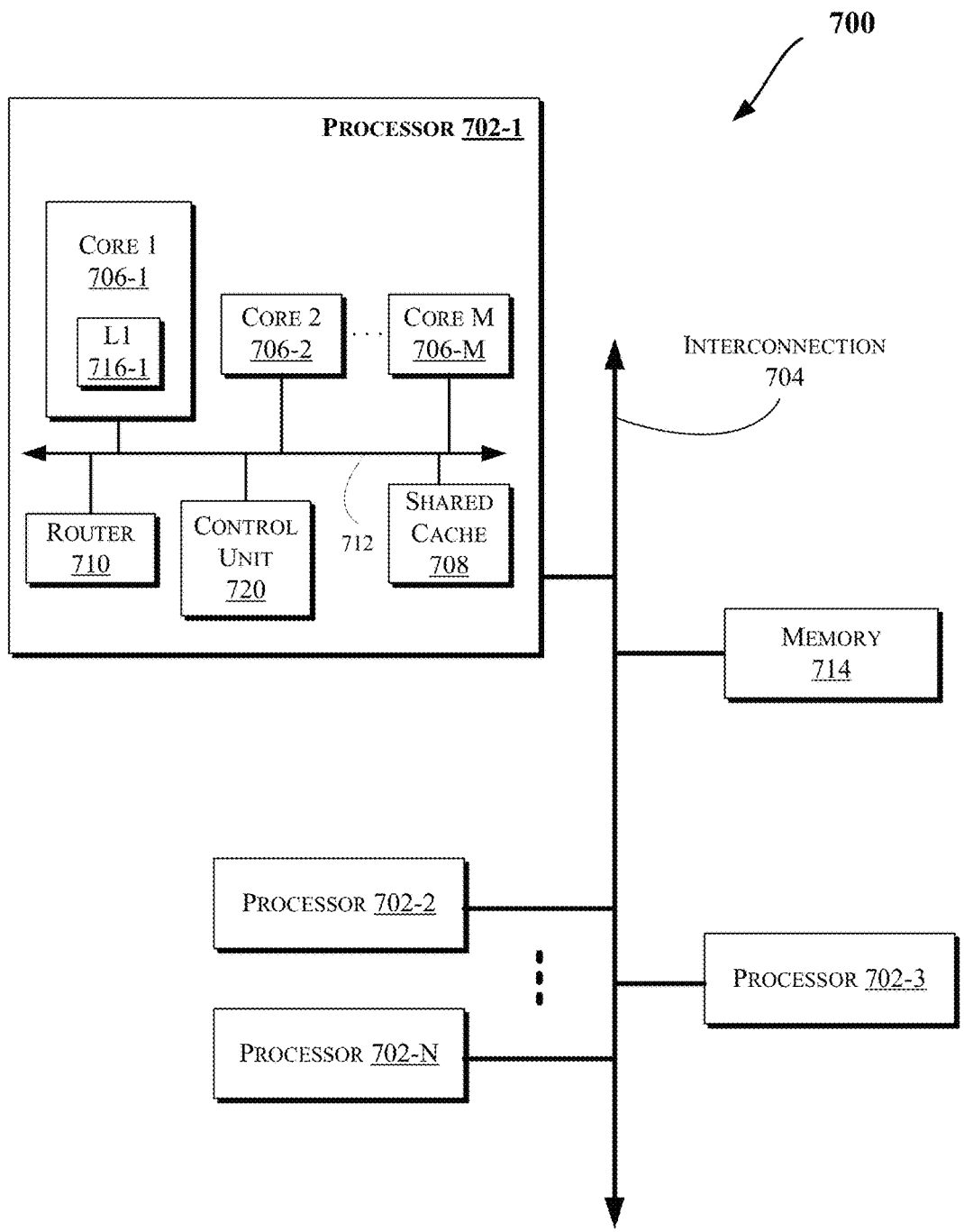

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
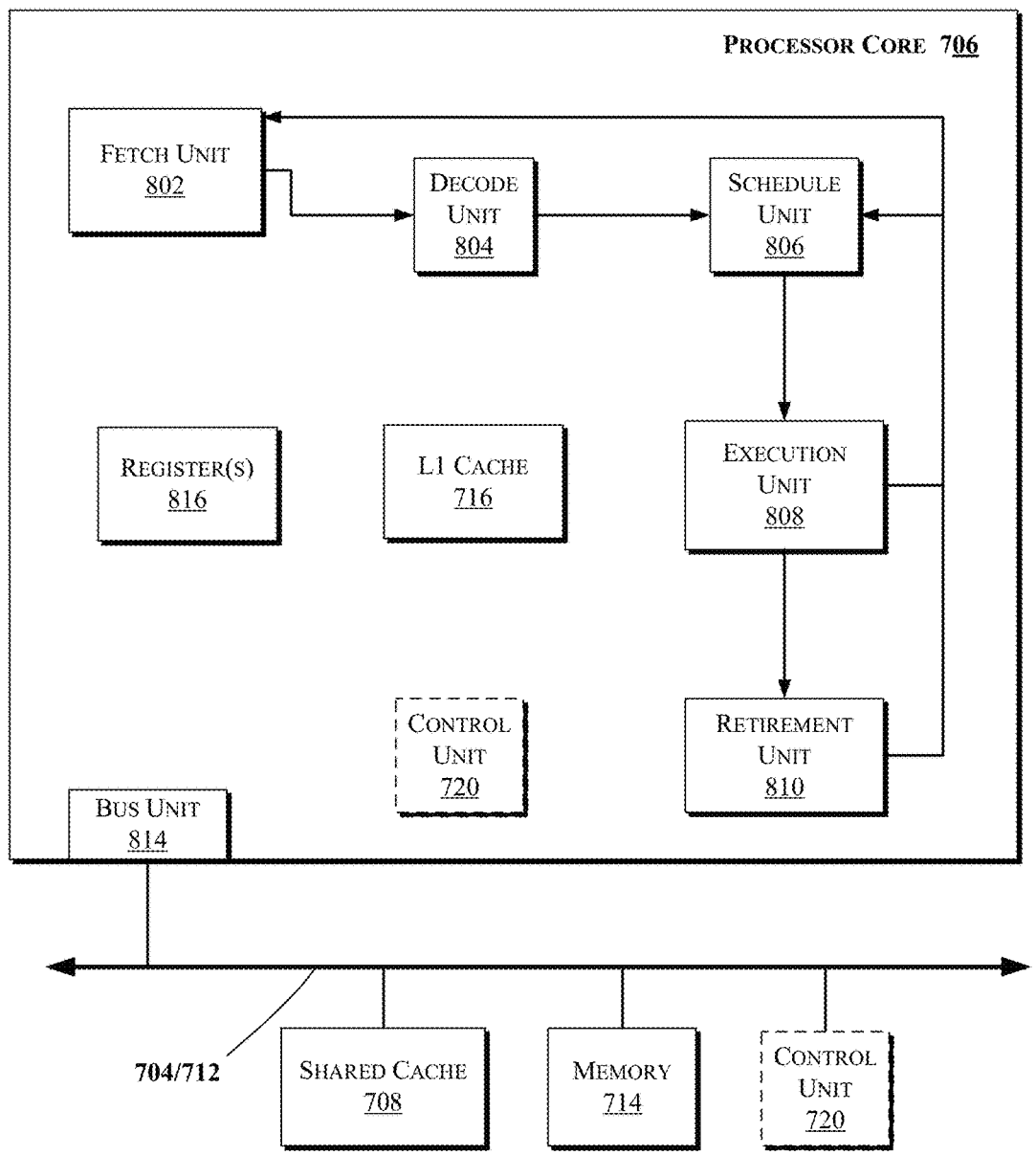

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
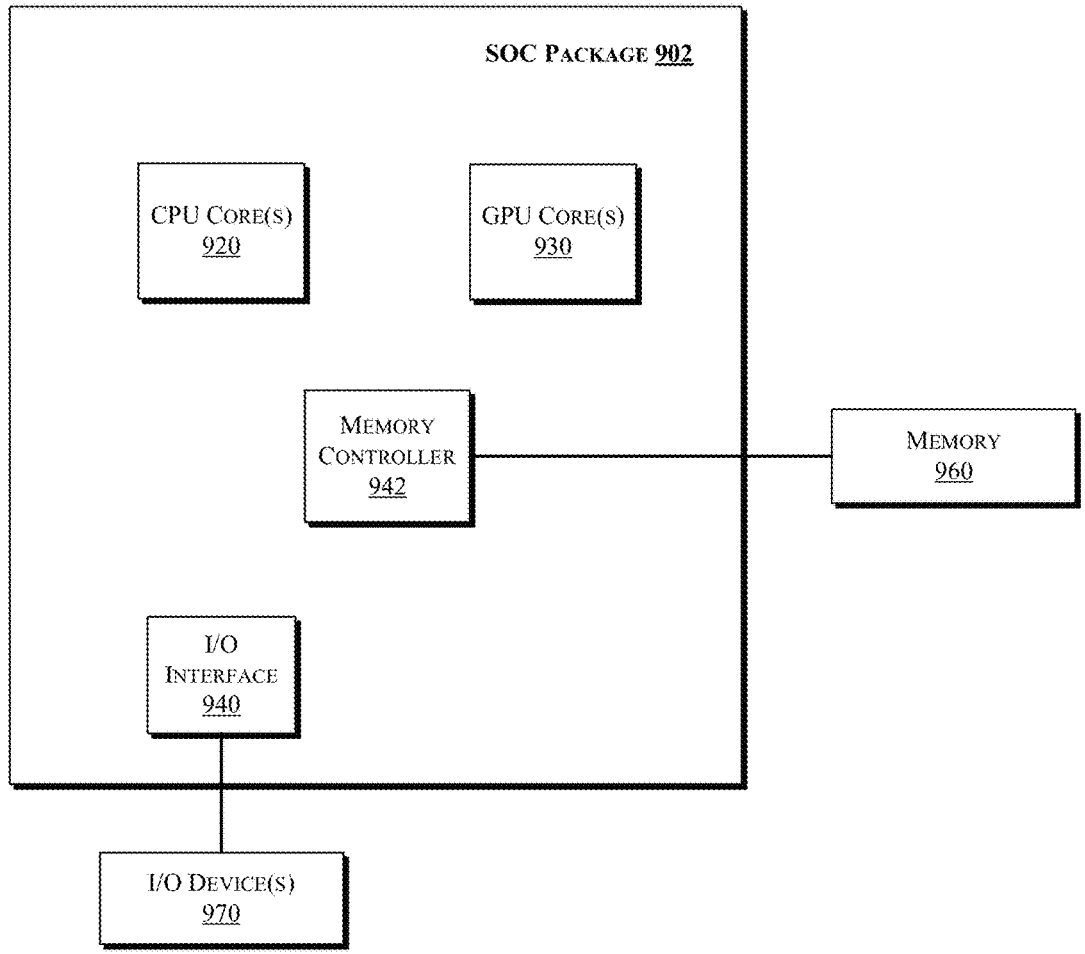

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
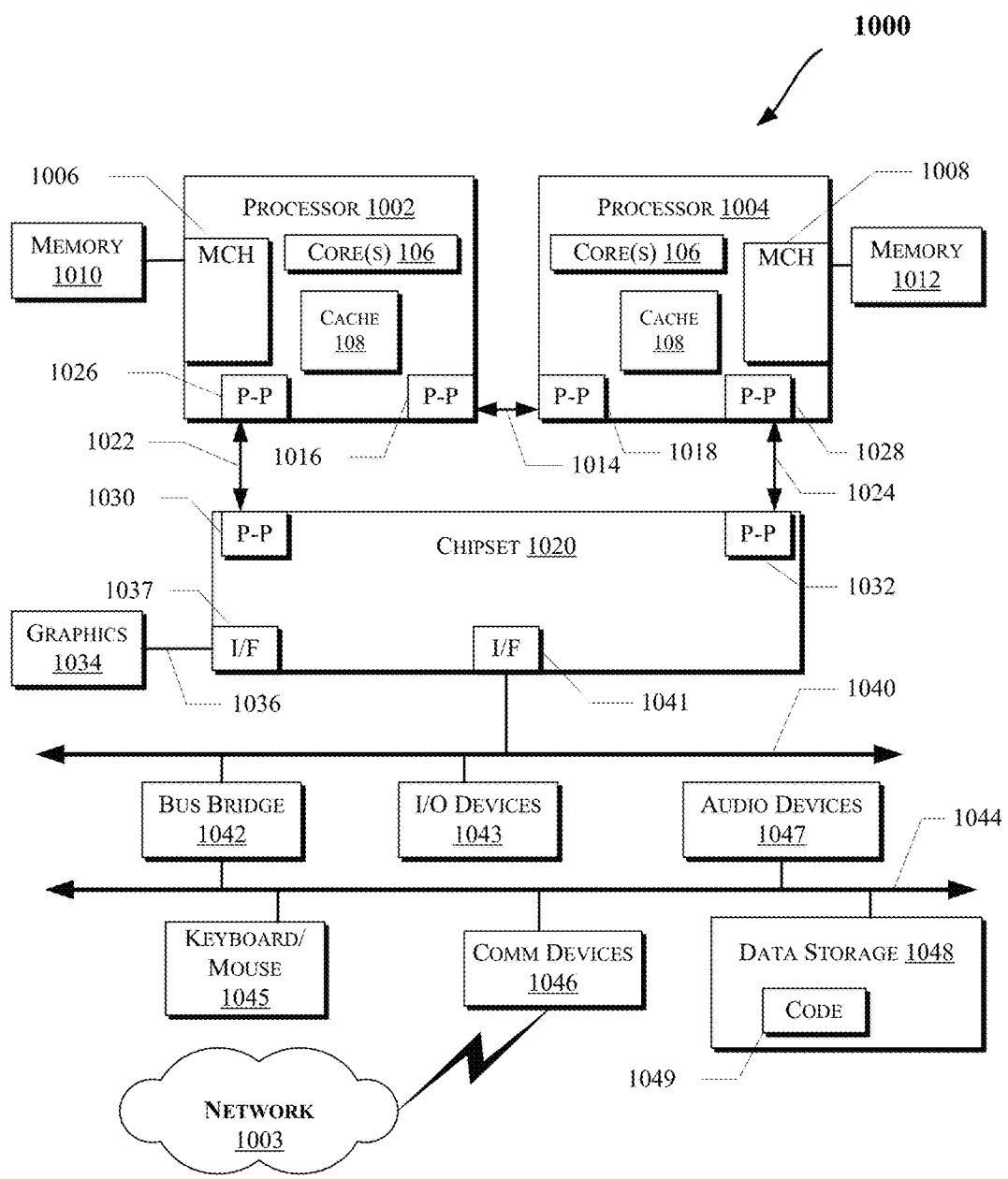

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a controller comprising logic, at least partially including hardware logic, configured to generate a signal to configure at least one sensor in a notify power state mode and place the signal on a communication bus coupled to the at least one sensor.

In Example 2, the subject matter of Example 1 can optionally include logic further configured to generate a signal to configure an interrupt priority in the at least one sensor, and place the signal on a communication bus coupled to the at least one sensor.

In Example 3, the subject matter of any one of Examples 1-2 can optionally include logic further configured to detect a change in an environmental condition, and change the interrupt priority of the at least one sensor in response to the change in the environmental condition In Example 4, the subject matter of any one of Examples 1-3 can optionally include logic further configured to receive a power state notifier signal from the at least one sensor, wherein the power state notifier signal identifies a power state of the slave device, and record the power state of the at least one sensor in a memory.

Example 5 is a sensor module, comprising at least one sensor and a controller communicatively coupled to the at least one sensor by a communication bus, the controller comprising logic, at least partially including hardware logic, configured to generate a signal to configure the at least one sensor in a notify power state mode, and place the signal on a communication bus coupled to the at least one sensor.

In Example 6, the subject matter of Example 5 can optionally include logic further configured to receive the signal from the controller, and configure the at least one sensor into a notify power state.

In Example 7, the subject matter of any one of Examples 5-6 can optionally include logic further configured to generate a signal to configure an interrupt priority in the at least one sensor and place the signal on a communication bus coupled to the at least one sensor.

In Example 8, the subject matter of any one of Examples 5-7 can optionally include logic further configured to receive the signal from the controller, and configure an interrupt priority of at least one sensor.

In Example 9, the subject matter of any one of Examples 5-8 can optionally include logic further configured to detect a change in an environmental condition, and change the interrupt priority of the at least one sensor in response to the change in the environmental condition.

In Example 10, the subject matter of any one of Examples 5-9 can optionally include logic further configured to receive a power state notifier signal from the slave device, wherein the power state notifier signal identifies a power state of the slave device, and record the power state of the slave device in a memory.

Example 11 is an electronic device comprising at least one processor, and a sensor module comprising at least one sensor, and a controller communicatively coupled to the at least one sensor by a communication bus, the controller comprising logic, at least partially including hardware logic, configured to generate a signal to configure the at least one sensor in a notify power state mode, and place the signal on a communication bus coupled to the at least one sensor.

In Example 12, the subject matter of Example 11 can optionally include logic further configured to receive the signal from the controller, and configure the at least one sensor into a notify power state.

In Example 13, the subject matter of any one of Examples 11-12 can optionally include logic further configured to generate a signal to configure an interrupt priority in the at least one sensor and place the signal on a communication bus coupled to the at least one sensor.

In Example 14, the subject matter of any one of Examples 11-13 can optionally include logic further configured to receive the signal from the controller, and configure an interrupt priority of at least one sensor.

In Example 15, the subject matter of any one of Examples 11-14 can optionally include logic further configured to detect a change in an environmental condition, and change the interrupt priority of the at least one sensor in response to the change in the environmental condition.

In Example 16, the subject matter of any one of Examples 11-15 can optionally include logic further configured to receive a power state notifier signal from the slave device, wherein the power state notifier signal identifies a power state of the slave device, and record the power state of the slave device in a memory.

Example 17 is a computer program product comprising logic instructions stored on a non-transitory computer readable medium which, when executed by a controller, configure the controller to generate a signal to configure a slave device in a notify power state mode and place the signal on a communication bus coupled to the slave device.

In Example 18, the subject matter of Example 17 can optionally include logic further configured to generate a signal to configure an interrupt priority in the at least one sensor, and place the signal on a communication bus coupled to the at least one sensor.

In Example 19, the subject matter of any one of Examples 17-18 can optionally include logic further configured to detect a change in an environmental condition, and change the interrupt priority of the at least one sensor in response to the change in the environmental condition.

In Example 20, the subject matter of any one of Examples 17-19 can optionally include logic further configured to receive a power state notifier signal from the at least one sensor, wherein the power state notifier signal identifies a power state of the slave device, and record the power state of the at least one sensor in a memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller comprising logic, at least partially including hardware logic, configured to:
    generate a signal to configure at least one sensor for an electronic device in a notify power state mode; and
    place the signal on a communication bus coupled to the at least one sensor; and
    transmit at least one feedback parameter to the at least one sensor, wherein the feedback parameter is used to adjust an input from the at least one sensor on the communication bus, wherein the feedback parameter is used to decrease a weight of an accelerometer input to the communication bus in response to an increase in an output of the accelerometer.

2. The controller of claim 1, further comprising logic, at least partially including hardware logic, configured to:
    generate a signal to configure an interrupt priority in the at least one sensor; and
    place the signal on a communication bus coupled to the at least one sensor.

3. The controller of claim 2, further comprising logic, at least partially including hardware logic, configured to:
    detect a change in an environmental condition; and
    change the interrupt priority of the at least one sensor in response to the change in the environmental condition.

4. The controller of claim 1, further comprising logic, at least partially including hardware logic, configured to:
    receive a power state notifier signal from the at least one sensor, wherein the power state notifier signal identifies a power state of the at least one sensor; and
    record the power state of the at least one sensor in a memory.

5. A sensor module, comprising:
at least one sensor; and
a controller communicatively coupled to the at least one sensor by a communication bus, the controller comprising logic, at least partially including hardware logic, configured to:
  generate a signal to configure the at least one sensor in a notify power state mode; and
  place the signal on a communication bus coupled to the at least one sensor; and
  transmit at least one feedback parameter to the at least one sensor, wherein the feedback parameter is used to adjust an input from the at least one sensor on the communication bus, wherein the feedback parameter is used to decrease a weight of an accelerometer input to the communication bus in response to an increase in an output of the accelerometer.

6. The sensor module of claim 5, wherein the at least one sensor comprises logic, at least partially including hardware logic, configured to:
  receive the signal from the controller; and
  configure the at least one sensor into a notify power state.

7. The sensor module of claim 5, wherein the controller further comprises logic, at least partially including hardware logic, configured to:
  generate a signal to configure an interrupt priority in the at least one sensor; and
  place the signal on a communication bus coupled to the at least one sensor.

8. The sensor module of claim 7, wherein the at least one sensor comprises logic, at least partially including hardware logic, configured to:
  receive the signal from the controller; and
  configure an interrupt priority of at least one sensor.

9. The sensor module of claim 6, wherein the controller further comprises logic, at least partially including hardware logic, configured to:
  detect a change in an environmental condition; and
  change the interrupt priority of the at least one sensor in response to the change in the environmental condition.

10. The sensor module of claim 6, wherein the controller further comprises logic, at least partially including hardware logic, configured to:
  receive a power state notifier signal from the at least one sensor, wherein the power state notifier signal identifies a power state of the at least one sensor; and
  record the power state of the at least one sensor in a memory.

11. An electronic device, comprising:
at least one processor; and
a sensor module, comprising:
  at least one sensor; and
  a controller communicatively coupled to the at least one sensor by a communication bus, the controller comprising logic, at least partially including hardware logic, configured to:
    generate a signal to configure the at least one sensor in a notify power state mode; and
    place the signal on a communication bus coupled to the at least one sensor; and
  transmit at least one feedback parameter to the at least one sensor, wherein the feedback parameter is used to adjust an input from the at least one sensor on the communication bus, wherein the feedback parameter is used to decrease a weight of an accelerometer input to the communication bus in response to an increase in an output of the accelerometer.

12. The electronic device of claim 11, wherein the at least one sensor comprises logic, at least partially including hardware logic, configured to:
  receive the signal from the controller; and
  configure the at least one sensor into a notify power state.

13. The electronic device of claim 11, wherein the controller further comprises logic, at least partially including hardware logic, configured to:
  generate a signal to configure an interrupt priority in the at least one sensor; and
  place the signal on a communication bus coupled to the at least one sensor.

14. The electronic device of claim 13, wherein the at least one sensor comprises logic, at least partially including hardware logic, configured to:
  receive the signal from the controller; and
  configure an interrupt priority of at least one sensor.

15. The electronic device of claim 12, wherein the controller further comprises logic, at least partially including hardware logic, configured to:
  detect a change in an environmental condition; and
  change the interrupt priority of the at least one sensor in response to the change in the environmental condition.

16. The electronic device of claim 12, wherein the controller further comprises logic, at least partially including hardware logic, configured to:
  receive a power state notifier signal from the at least one sensor, wherein the power state notifier signal identifies a power state of the slave device; and
  record the power state of the at least one sensor in a memory.

17. The controller of claim 1, wherein the feedback parameter is used to decrease a weight of a magnetometer input to the communication bus in response to an increase in an output of the magnetometer.

18. The controller of claim 1, wherein the feedback parameter is used to decrease a weight of a gyroscope input to the communication bus in response to a location algorithm converging.

19. The controller of claim 2, further comprising logic, at least partially including hardware logic, configured to:
  set the interrupt priority of an accelerometer to an initial value during a configuration process; and
  increase the interrupt priority in response to a determination that the electronic device is in motion.

* * * * *